United States Patent [19]

Lemercier

[11] Patent Number: 4,666,652
[45] Date of Patent: May 19, 1987

[54] FAST NEUTRON NUCLEAR REACTOR COMPRISING A SUSPENDED SEALING SLAB AND MAIN VESSEL

[75] Inventor: Guy Lemercier, Le Puy Ste Reparade, France

[73] Assignee: Commissariat a l'Energie Atomique, Paris, France

[21] Appl. No.: 703,422

[22] Filed: Feb. 20, 1985

[30] Foreign Application Priority Data

Mar. 2, 1984 [FR] France ................. 84 03303

[51] Int. Cl.⁴ ............................................. G21C 13/00
[52] U.S. Cl. .................................. 376/205; 376/290; 376/404; 376/461
[58] Field of Search ............... 376/290, 404, 405, 403, 376/461, 205, 206, 460

[56] References Cited

U.S. PATENT DOCUMENTS

| | | | |
|---|---|---|---|
| 3,769,161 | 10/1973 | Costes | 376/290 X |
| 3,841,964 | 10/1974 | Dumayne | 376/460 X |
| 3,926,722 | 12/1975 | Dupen . | |
| 3,953,289 | 4/1976 | Costes | 376/461 |
| 3,995,918 | 12/1976 | Mahe et al. . | |
| 4,022,657 | 5/1977 | Lemercier . | |
| 4,050,988 | 9/1977 | Lemercier | 376/290 |
| 4,055,464 | 10/1977 | Lemercier . | |
| 4,326,920 | 4/1982 | Facha et al. . | |
| 4,464,334 | 7/1984 | Artaud et al. . | |

FOREIGN PATENT DOCUMENTS 39796 12/1975 Japan ................................. 376/461

OTHER PUBLICATIONS

Atomkernenergie, vol. 30, No. 4, 1977, F. R. Mynatt, "Shielding Methods Development in the United States", pp. 238-243.

Primary Examiner—Stephen C. Bentley
Assistant Examiner—John S. Maples

[57] ABSTRACT

A fast neutron nuclear reactor, in which the main vessel and the slab for sealing said vessel are separately suspended on the upper part of the vessel shaft. An outer ferrule of the slab is directly anchored in the vessel shaft by tie rods and is supported by an annular ring embedded in the concrete. The upper edge of the main vessel is welded beneath the ring, the vessel being supported by a second annular ring embedded in the concrete. The upper faces of the slab and the vessel shaft are consequently at the same level, thereby reducing the heights of the vessel shaft and the safety vessel.

6 Claims, 3 Drawing Figures

FAST NEUTRON NUCLEAR REACTOR COMPRISING A SUSPENDED SEALING SLAB AND MAIN VESSEL

BACKGROUND OF THE INVENTION

The present invention relates to a fast neutron nuclear reactor of the type in which the reactor core is housed in a vessel, called the main vessel filled with liquid metal and sealed by a slab. More specifically, the invention relates to the supporting of the main vessel and the sealing slab by the upper part of the vessel shaft formed in the concrete enclosure for receiving the main vessel, in the case of a reactor of the aforementioned type.

FIG. 1 is a diagrammatic cross-sectional view of a known, integrated fast neutron reactor. It is possible to see the concrete enclosure 10 defining the vessel shaft 12, in the upper part of which is hung the main vessel 14 containing the reactor core 16. The latter rests on a supply support 18, which itself rests on the bottom of vessel 14 via flooring 20.

The upper end of the main vessel 14 is sealed by a sealing slab 22 and contains the primary liquid metal 24, generally sodium. An inner vessel 26 separates the sodium 24 in vessel 14 into two separate volumes. Thus, the inner vessel 26 respectively defines a hot collector 24a and a cold collector 24b.

In its peripheral part, slab 22 supports a certain number of heat exchangers 28 and pumps 30. Under the action of pumps 30, the hot sodium leaving the reactor core 16 traverses the hot collector 24a prior to entering exchangers 28 through inlets 28a. The heat carried by the primary fluid is then transmitted to the secondary fluid. The cooled primary sodium leaves the exchangers through outlets 28b issuing into the cold collector 24b. It is then taken up by pumps 30 and is delivered to the supply support 18 of core 16 by pipes 32. Generally, the main vessel 14 is duplicated by a safety vessel 34, which is also suspended on the upper part of the vessel shaft.

Fast neutron nuclear reactors of the loop type are distinguished from fast neutron reactors of the integrated type by the fact that the exchangers and optionally the pumps are no longer located within the main vessel and are instead positioned outside the latter. However, the operation of the reactor and the problems connected with the supporting of the vessel and the slab are the same. Therefore, the present invention can apply either to integrated or loop-type fast neutron reactors.

FIG. 2 shows on a larger scale and in greater detail the supporting of vessels 14 and 34, as well as slab 22 by the upper part of the vessel shaft in the reactor of FIG. 1. It is clearly visible that the main vessel 14 and sealing slab 22 are suspended in the upper part of the vessel shaft by a common support ferrule 36, which forms both the outer ferrule of the slab and the upper part of the main vessel 14.

In this configuration, the attachment point 40 of the lower base plate 42 of the slab to the upper part of vessel 14 must be positioned at a certain distance above the internal neutral gas atmosphere above the free sodium level of the main vessel 14 and must be thermally insulated from said atmosphere. Thus, if such a precaution is not taken, the upper part of the main vessel would be exposed to unacceptable thermal stresses resulting from the large temperature difference existing between the slab 22, cooled by a circulation of fluid diagrammatically represented by the arrows in FIG. 2, and the internal neutral gas atmosphere of the vessel 14. Thus, FIG. 2 shows that it is conventional practice to produce slab 22 in such a way that it has a downwardly projecting portion with respect to its attachment point 40 on the vessel. Thus, between vessel 14 and the lower base plate 42 of the slab, there is an annular zone 43, in which is placed a heat insulating material 44.

Moreover, it is known that the thickness of slab 22 is determined, particularly with regards to its concrete filling, by a compromise between its neutron protection function and the criteria linked with its mechanical behaviour and cost.

Thus, FIG. 2 shows that, according to the prior art, this compromise makes it necessary to place the upper base plate 46 of slab 22 at a lower level than the upper face of concrete enclosure 10. Thus, for a given dimensioning of the reactor block, if the thickness of the slab is approximately 2700 mm, this displacement reaches approximately 850 mm.

As a result of this lowering of the upper level of the slab relative to the concrete enclosure surrounding it, any sodium leak occurring at the passage through the slab may lead to a sheet-like sodium fire thereon. The consequences of such a fire can be relatively serious, so that in existing structures, it is necessary to provide protection elements, such as one or more sodium retention tanks.

Moreover, the downward displacement of the slab 22 relative to the upper face of the concrete enclosure 10 increases by the same amount the vertical dimensions of certain of the reactor components. In particular, the heights of the concrete enclosure 10, the safety vessel 34 and its thermal insulation are increased by this displacement. Other components, such as exchangers and handling locks consequently also have an increased height at the point of traversing the slab. This leads to an increase in the cost of the reactor.

The present invention specifically relates to a fast neutron nuclear reactor, in which the main vessel and its sealing slab are separately suspended on the vessel shaft. This eliminates any displacement between the upper face of the slab and the upper case of the concrete enclosure surrounding it. This prevents any risk of sheet-like sodium fire on the slab, without it being necessary to use costly ancillary means. Moreover, the height of a certain number of reactor components is reduced by the height of the displacement of the slab relative to the upper face of the concrete enclosure which, in the aforementioned example, represents approximately 850 mm, which leads to a substantial reduction in the costs of the reactor.

Thus, the invention relates to a fast neutron nuclear reactor comprising a liquid metal-filled main vessel containing the reactor core, a sealing slab which seals the vessel and a concrete enclosure defining a vessel shaft in which are located and suspended the main vessel and its sealing slab, wherein the slab and the main vessel are directly suspended on the upper part of the vessel shaft by separate supporting means.

According to a preferred embodiment of the invention, the slab comprises a peripheral ferrule, whose upper end is anchored in the concrete enclosure in the upper part of the vessel wall by anchoring means, and a first horizontal support ring, provided with welded vertical stiffeners and whose inner periphery is welded, during production, in the vicinity of the upper end of the ferrule and whose outer periphery is sealed in the concrete enclosure below the anchoring means, the upper end of the main vessel being welded, following its installation in the vessel shaft, to the first support ring at a given distance from the peripheral ferrule of the slab, the supporting means for the main vessel also comprising a second horizontal support ring provided with vertical stiffeners and whose inner periphery is welded, during production, in the vicinity of the upper end of the main vessel and whose outer periphery is sealed in the concrete enclosure.

When the reactor also comprises in per se known manner a safety vessel surrounding the main vessel, the safety vessel can be directly suspended in the upper part of the vessel shaft by supporting means separated from the supporting means for the main vessel and the supporting means for the slab.

According to a preferred embodiment of the invention, the upper end of the safety vessel is welded, following installation in the vessel shaft, to the second support ring at a given distance from the main vessel, the supporting means for the safety vessel also comprising a third horizontal support ring, provided with vertical stiffeners and whose inner periphery is welded, during manufacture, to the safety vessel, in the vicinity of its upper end, said third support ring being sealed in the concrete enclosure.

According to another appect of the invention, the slab has an upper portion laterally defined by a second ferrule, whose lower end is fixed to the peripheral ferrule below the first support ring, by means of a connecting ring, said ferrules defining between them an annular space housing a thermal insulating means, the upper face of the slab being substantially located in the same horizontal plane as the upper face of the concrete enclosure around the vessel shaft.

In this case, the main vessel defines with the peripheral ferrule of the slab and with the upper end of the safety vessel, two annular spaces which can house heat insulating means, which are relatively tight to sodium leaks and compatible with the said liquid metal.

BRIEF DESCRIPTION OF THE DRAWINGS

The invention is described in greater detail hereinafter relative to a non-limitative embodiment of the invention with reference to the attached drawings, wherein show.

DETAILED DESCRIPTION OF THE PREFERRED EMBODIMENT

Figure 3:
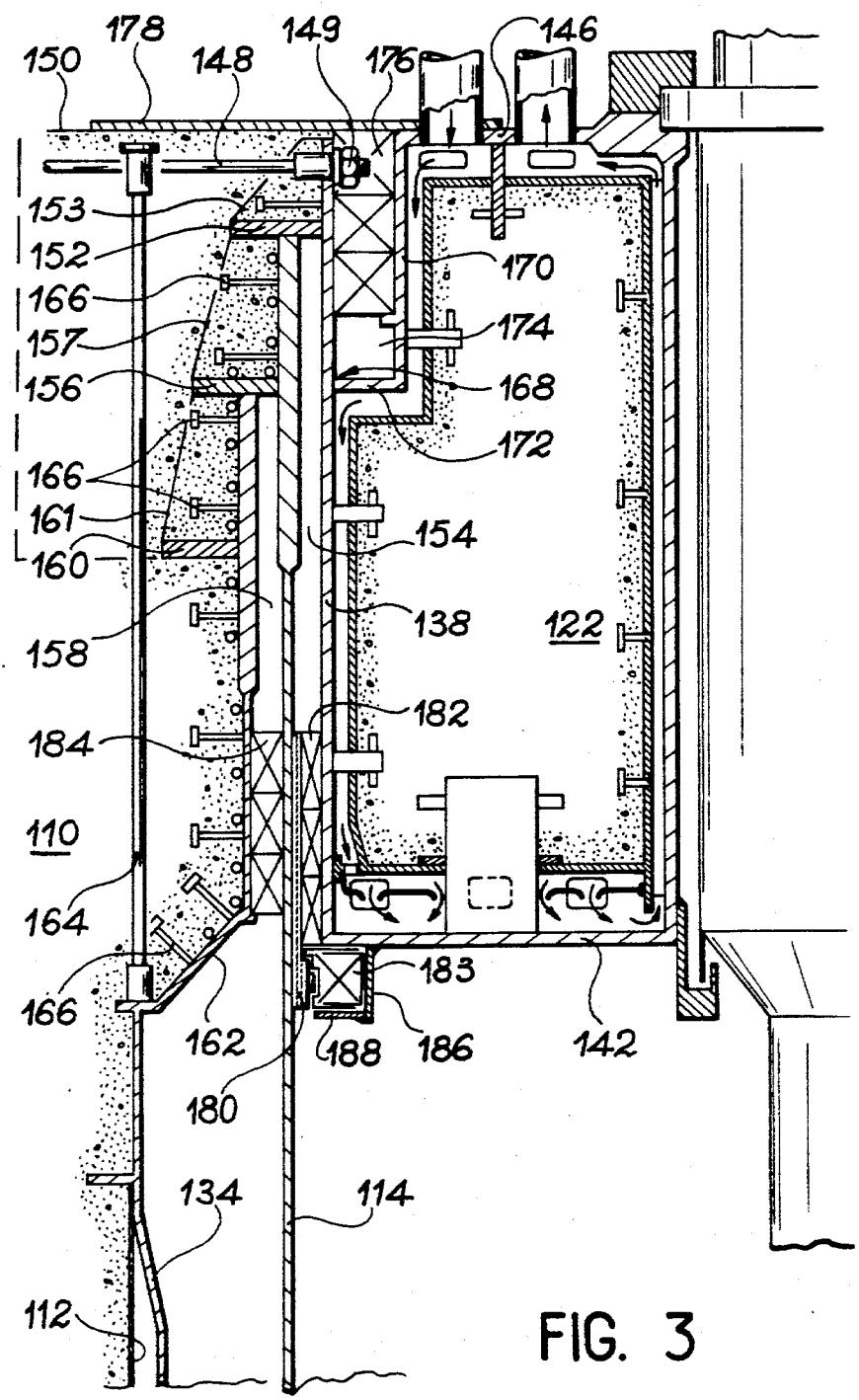
FIG. 3 a view comparable to FIG. 2 showing the supporting of the vessels and the slab of a fast neutron reactor according to the invention.

FIG. 3 shows the upper part of the vessel shaft 112 formed in the concrete enclosure 110 for receiving the main vessel 114, the safety vessel 134 and the sealing slab 122 of the vessel 114. This concrete part is cast following the installation and assembly of the supports of safety vessel 134, main vessel 114 and slab 122.

According to the invention, the main vessel 114, slab 122 and safety vessel 134 are directly suspended on the upper part of the vessel shaft 112 by separate supporting means.

Thus, th.e outer cylindrical ferrule 138 of slab 122 is directly anchored by its upper end to concrete enclosure 110, in the upper part of the vessel shaft 112. Slab 122 is supported by a horizontal support ring 152, provided with vertical stiffeners 153 (only one being visible in FIG. 3) and whose inner periphery is welded to ferrule 138. The outer part of ring 152 is embedded in the concrete of enclosure 110. In practice and as shown in FIG. 3, this anchoring is completed by radial tie rods 148 embedded in the concrete of enclosure 110 and which traverse the ferrule 138, whilst being maintained in compression with ferrule 138 by nuts 149. The tie rods 148 are arranged in a regular manner, e.g. every degree, over the periphery of the slab between the upper face 150 of that part of enclosure 110 surrounding the vessel shaft 112 and the support ring 152.

According to the invention, the main vessel 114 is suspended directly on enclosure 110 independently of slab 122. For this purpose, FIG. 3 shows that the cylindrical upper part of vessel 114 surrounds that part of ferrule 138 located below the support ring 152. Thus, between ferrule 138 and the upper part of vessel 114 is defined an annular space 154, whose dimensions make it possible to obtain access to welds for any inspection which may be necessary in service.

The outer upper edge of the main vessel 114 is welded, during assembly, to the lower face of support ring 152. Moreover, the outer face of vessel 114 is welded, at a certain distance below horizontal ring 152, to a second horizontal support ring 156. As for ring 152, most of the ring 156 is sealed in the concrete of enclosure 110.

The safety vessel 134 is also directly suspended on the upper part of the vessel shaft, independently of main vessel 114 and slab 122.

For this purpose, the upper part of vessel 134 surrounds the upper part of vessel 114 located below the support ring 156. Thus, an annular space 158 is formed between the upper parts of the two vessels. Like space 154, space 158 has a sufficient width to permit the inspection of welds.

The outer upper edge of the safety vessel 32 is welded, during assembly, to the lower face of support ring 156. Moreover, the actual support of the safety vessel is produced by means of a third horizontal support ring 160, equipped with vertical stiffeners 161 (only one being visible in FIG. 3). For this purpose, the inner peripheral edge of ring 160 is welded, during manufacture, to the outer face of the upper cylindrical part of vessel 134. As illustrated in FIG. 3, ring 160 is completely sealed into the concrete of enclosure 110.

Safety vessel 134 has a frustum-shaped part 162, roughly level with the lower base plate 142 of slab 122. This part is extended downwards by the cylindrical wall of vessel 134, which constitutes the internal covering of vessel shaft 112 in the upper part of the latter.

The safety vessel is anchored by means of vertical tie rods 164, fixed to the lower end of the frustum-shaped part 162, in the extension of the cylindrical wall of vessel 134. The tie rods 164 extend upwards to the vicinity of the upper face 150 of that part of enclosure 110 surrounding the vessel shaft and are embedded in the concrete of enclosure 110. Tie rods 164 are regularly distributed over the entire periphery of the vessel shaft and are e.g. spaced by two degrees.

The assembly formed by the radial tie rods 148 and the vertical tie rods 164 makes it possible to compensate the maximum torque of the support means for the vessels and the slab and to compressively stress the concrete of enclosure 110.

In per se known manner, the anchoring means of ferrule 138 and the upper parts of vessel 114 and 134 in the concrete of enclosure 110 are supplemented by a large number of sealing lugs or tabs 166, fixed to said parts and sealed in the concrete of the vessel shaft. Like tie rods 164, these sealing tabs 166 are regularly distributed over the entire periphery of the vessel shaft, e.g. every two degrees.

The vertical stiffeners 161, 157 and 153 are respectively welded to support rings 160, 156 and 152 as well as to the outer upper ends of safety vessel 134, main vessel 114 and slab ferrule 138.

As a result of the inventive use of separate support means for slab 122 and main vessel 114, the upper base plate 146 of slab 122 can be positioned at the same level or even higher than the upper face 150 of that part of enclosure 110 which surrounds the vessel shaft. Thus, a comparison of FIGS. 2 and 3 respectively illustrating the prior art and the present invention shows that that part of the slab projecting downwards within the main vessel in existing reactors is transferred according to the invention to the upper part of the slab, the total thickness thereof remaining unchanged. This modification to the structure of the slab is made possible by eliminating the welding of the lower base plate 142 of the slab to the main vessel 114.

Moreover, the upper planar base plate 146 is connected to the outer ferrule 138, below the support area thereof by concrete enclosure 110. This is justified by the need to permit a thermal expansion of slab 122, whilst minimizing the thermal stresses of ferrule 138.

Figure 1:
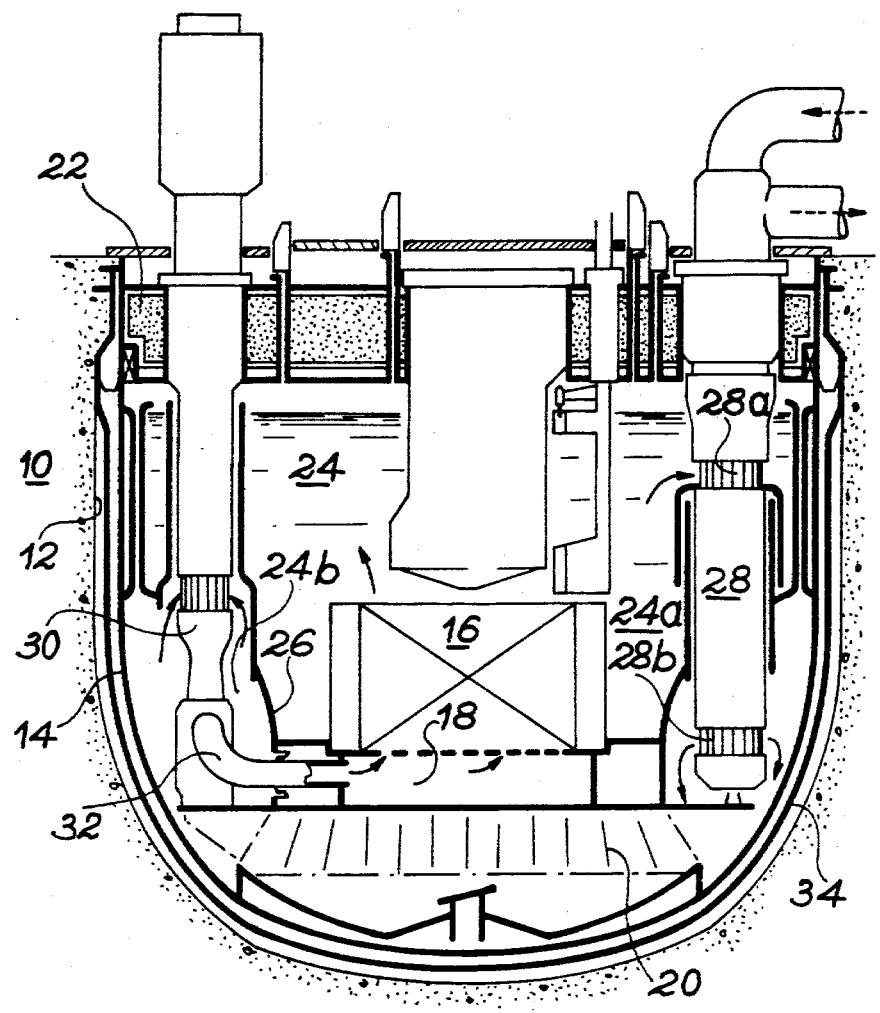
FIG. 1, already dsscribed, diagrammatically and in cross-section an integrated fast neutron reactor according to the prior art.
Figure 2:
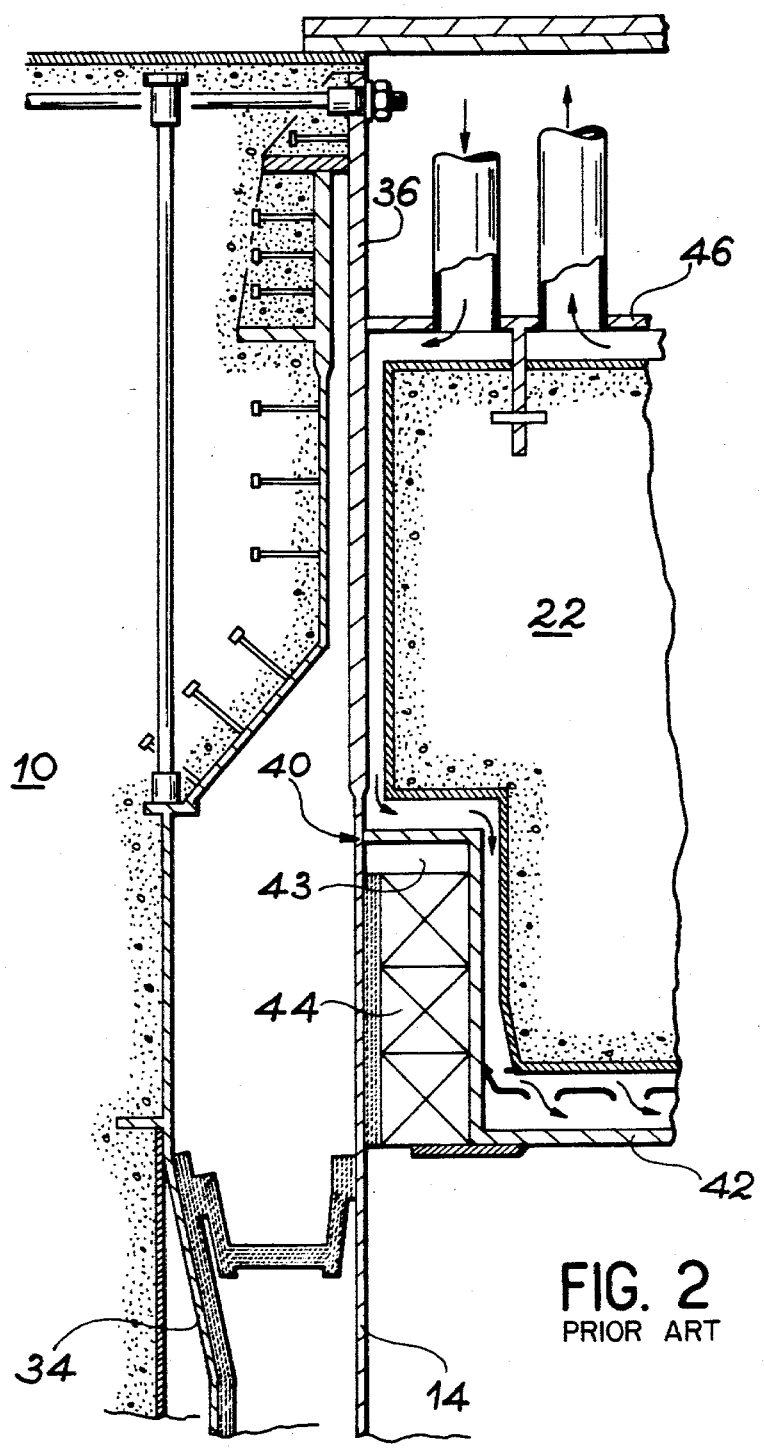
FIG. 2, already described, a larger scale sectional view showing the supporting of the vessels and the slab of the reactor according to the prior art of FIG. 1.

In practice, this heightwise displacement between the upper base plate 146 of slab 122 and its fixing point 168 to ferrule 138 is obtained in a manner comparable to the heightwise displacement between the lower base plate 42 and its fixing point 40 to the main vessel 14 according to the prior art shown in FIG. 2.

Thus, the outer peripheral edge of the upper base plate 146 is welded to the upper edge of a coaxially arranged ferrule 170, which is at a certain distance within ferrule 138. The lower edge of ferrule 170 is welded to the inner peripheral edge at a horizontal ring 172, whose outer peripheral edge is welded at 168 to the interior of ferrule 138. Ring 172 is positioned approximately at the same level as ring 156. An upwardly open annular space 174 is consequently formed between the ferrules 170 and 138. The width of this space is conditioned by the access to the welds and its depth is a function of the admissible thermomechanical stresses for ferrule 138. The atmosphere in space 174 is the same as the atmosphere present in the reactor building (not shown) overhanging the slab and in general this atmosphere is air.

To prevent sodium from a possible leak on the slab from coming into contact with the suspension ferrule 138, annular space 174, or at least the upper part thereof, is filled with an elastic insulating means 176. The latter is comparable to the means 44 insulating the fixing point 40 of the lower base plate 42 of the slab in the prior art and as illustrated in FIG. 2. Thus, means 176 can in particular be constructed according to the teachings of U.S. Pat. No. 3,995,918. However, means 176 can be more rudimentary and can in particular comprise mineral heat insulation, except in the upper part which has to resist the action and possible infiltration of liquid sodium. To complete the protection, a metal plate 178 obstructs a space 174 covering both part of the upper base plate 146 of the slab and part of the upper face 150 of the enclosure 110.

As a result of the structure described hereinbefore, the receptacle formed above the slab as a result of the displacement existing in the prior art solutions between the upper base plate of the slab and the upper face of the concrete enclosure is eliminated. It is therefore possible to reduce, or even eliminate the protection against sodium fires on the slab, provided that ferrule 138 supporting the latter is protected.

For a reactor having a given design and power, it is known that the depth of the main vessel from the lower base plate of the slab is clearly defined. Moreover, it has been seen that the thickness of the slab remains unchanged in this solution compared with the prior art. Thus, the height of a certain number of components of this reactor is reduced by the present invention. The value of this reduction corresponds to the elimination of the displacement existing in the prior art solutions between the upper base plate 46 of the slab and the upper face of the concrete enclosure. This height reduction resulting from the invention firstly relates to the civil engineering of the vessel shaft, the safety vessel 134 and its thermal insulation (not shown). It also relates to that part of the exchangers between the flanges by which they rest on the upper face of the slab and the outlet axes of the pipes of the secondary circuits, as well as the strut of the lock of the primary handling crossing and its ramp (not shown).

Finally, compared with the prior art solutions, the mass of the protective concrete is increased in the lower part of the slab. The thermal inertia of this part of the slab is increased. The axial heat gradients are consequently reduced in the case of a cooling incident, particularly in the case of a lack of tension.

Moreover, according to the invention, the upper parts of the main vessel and the slab are less thermally stressed as a result of the splitting up of the charges, particularly at their attachment point, which is close to the temperature of the vessel shaft.

As illustrated in FIG. 3, the annular space 154 formed between the upper part of the main vessel 114 and the outer ferrule 138 of the slab is closed at its base by the combination of a metal thermal insulation 180 engaged with the vessel and an elastic insulating means 182, which make it possible to prevent convective neutral gas rises. In order to complete the sealing of the annular space 154, an insulating means 183, which is thicker than insulating means 182, is located beneath the latter and is held against the lower part of the metal heat insulation 180 by a ferrule 186 welded to the base plate 142 of slab 122, as well as plates 188 which are welded, after fitting the thermal insulation, to ferrule 186. The thermal insulation 180 and the elastic insulating means 182,183 are produced in per se known manner, e.g. according to U.S. Pat. Nos. 4,022,657 and 4,055,464.

In a comparable manner, the space 158 formed between the upper parts of vessels 114 and 134 can be closed at its base by an elastic insulating means 184 similar to means 182.

The structure of the actual slab does not form part of the present invention and will consequently not be described herein. It should be simply noted that slab 122, as partly shown in FIG. 3, is preferably constructed according to U.S. Pat. No. 4,464,334. However, any other structure could be envisaged without passing outside the scope of the invention.

According to the invention, the assemblies formed by the main vessel 114 and its support ring 56, provided with stiffeners 161, slab 122 and its support ring 152, provided with stiffeners 153 and the upper part of safety vessel 134 and its support ring 160, provided with stiffeners 161 can be entirely manufactured in the workshop on the site of the reactor during the construction of the latter. Compared with the prior art solutions, this eliminates the difficult operation of homogeneous welding between the main vessel and the upper part of the vessel carried out inside the reactor block. The presence of the support ring also makes it easier to handle the vessel.

What is claimed is:

1. A fast neutron nuclear reactor comprising: a liquid metal-filled main vessel containing a reactor core, a sealing slab which seals the vessel, and a concrete enclosure defining a vessel shaft in which are located and suspended the main vessel and the sealing slab, the slab and the main vessel being directly suspended on an upper part of the vessel shaft by separate supporting means, the slab comprising a peripheral ferrule having an upper end, anchoring means for anchoring the upper end in the concrete enclosure in the upper part of the vessel shaft, a first horizontal support ring having welded vertical stiffener means and an inner periphery welded in the vicinity of the upper end of the ferrule and an outer periphery sealed in the concrete enclosure below the anchoring means, the upper end of the main vessel being welded to the first support ring at a given distance from the peripheral ferrule of the slab, the supporting means for the main vessel also comprising a second horizontal support ring having vertical stiffener means and having an inner periphery welded in the vicinity of the upper end of the main vessel and an outer periphery sealed in the concrete enclosure.

2. A nuclear reactor according to claim 1, wherein the slab has an upper portion laterally defined by a second ferrule having a lower end fixed to the peripheral ferrule below the first support ring, by means of a connecting ring, said ferrules defining therebetween an annular space housing a thermal insulating means, the slab having an upper face substantially located in the same horizontal plane as an upper face of the concrete enclosure around the vessel shaft.

3. A nuclear reactor according to claim 1, wherein said reactor also comprises a safety vessel surrounding the main vessel and directly suspended on the upper part of the vessel shaft by means for supporting the safety vessel.

4. A nuclear reactor according to claim 3, wherein the upper end of the safety vessel is welded to the second support ring at a given distance from the main vessel, the supporting means for the safety vessel also comprising a third horizontal support ring having vertical stiffener means, and having an inner periphery welded to the safety vessel, in the vicinity of the upper end, said third support ring being sealed in the concrete enclosure.

5. A nuclear reactor according to claim 4, wherein the main vessel defines with the peripheral ferrule of the slab and with the upper end of the safety vessel, two annular spaces housing thermal insulation means.

6. A nuclear reactor according to claim 5, wherein an additional annular space is closed below a lower base plate of the slab, by a thermal insulation means held in place by a ferrule welded to the base plate and plate means welded to the ferrule.

* * * * *